Patented Apr. 26, 1938

2,115,311

UNITED STATES PATENT OFFICE 2,115,311

DYESTUFFS OF THE OXAZINE SERIES AND A PROCESS OF PREPARING THEM

Georg Kränzlein, Heinrich Greune, and Max Thiele, Frankfort-on-the-Main, Germany, assignors to General Aniline Works, Inc., New York, N. Y., a corporation of Delaware No Drawing. Application October 26, 1934, Serial No. 750,202. In Germany June 6, 1928

9 Claims. (Cl. 260—28)

This application is a continuation-in-part of our co-pending application Serial No. 364,316, filed May 18, 1929 (now U. S. P. 2,026,092 granted December 31, 1935).

The present invention relates to dyestuffs and to a process of preparing them.

We have found as a surprising fact that benzoquinone derivatives of the following formula:

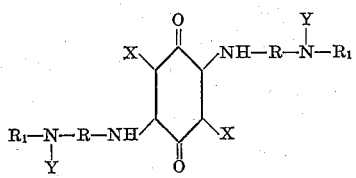

wherein X stands for hydrogen or halogen, Y stands for hydrogen or alkyl and the R's stand for aromatic groups of the benzene or naphthalene series, having at least one unsubstituted position adjacent to the NH-groups, the $R_1$'s stand for aromatic groups of the benzene, diphenyl or naphthalene series and wherein the two $R_1$—N—R—chains are identical, yield, when being heated as such alone or with the addition of an oxidizing agent and, if necessary, of a catalyst, in a high-boiling solvent, bluish condensation products, from which, by sulfonation, water-soluble dyestuffs are obtained which dye the fiber valuable blue, bluish-gray or bluish-green tints.

To perform the reaction there may be used as high-boiling solvents nitrobenzene, trichlorobenzene or the like, as oxidizing agents potassium ferricyanide, pyrolusite, ferric chloride or similar products and as catalysts there may be used phosphorus pentachloride, antimony pentachloride and others more. The sulfonation may preferably be carried out by means of fuming sulfuric acid or concentrated sulfuric acid.

Instead of first condensing and then introducing the sulfo group by a subsequent operation as above stated it is, of course, also possible to introduce the sulfo group already before the oxazine has been formed, by starting, for instance, from an amino-diaryl-amine-sulfonic acid.

Our invention leads to new valuable dyestuffs, for instance, those which have the following constitution:

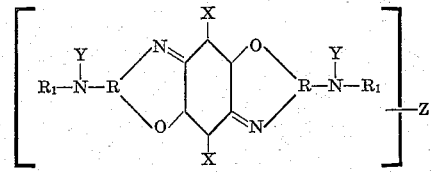

wherein Z means that the dyestuff may be sulfonated, X stands for hydrogen or halogen, Y means hydrogen or alkyl and R represents an aromatic group of the benzene or napthalene series, the position of the sulfo group being undetermined. $R_1$ for an aromatic group of the benzene, diphenyl or naphthalene series, and wherein the two $R_1$—N—R—chains are identical.

Both by their excellent fastness to light and their remarkable shades these new blue, bluish-gray and bluish-green dyestuffs are particularly valuable for dyeing silk.

When reacting upon the said new sulfonated dyestuffs in the manner indicated in U. S. Patent No. 1,800,299 with the bases characterized in the said patent, blue, bluish-gray and bluish-green dye pigments are obtained which are very suitable as nitrocellulose (varnish)-, cellon- and alcohol lacquers.

The following examples serve to illustrate the invention but they are not intended to limit it thereto, the parts being by weight:

(1) 100 parts of 2.5-di(-para-aminodiphenyl-amino)-3.6-dichloro-1.4-benzoquinone are heated to boiling temperature for 8 hours with 12 parts of phosphorus pentachloride and 5 parts of pyrolusite in 1000 parts of nitrobenzene. After cooling, the separated condensation product is filtered by suction, subsequently washed with alcohol and dried.

It forms a crystalline powder showing a violet luster on its surface, is insoluble in water, somewhat soluble in benzene to a reddish-violet solution, sparingly soluble in alcohol to a blue and in nitrobenzene to a brownish-violet solution. By sulfonating it by means of sulfuric acid or fuming sulfuric acid, a sulfonic acid is obtained which dyes silk and wool blue tints of very good fastness to light and which has also in aqueous or soda alkaline solution a great affinity for the ordinary or previously mordanted textile fiber.

The 2.5-di(-para-aminophenylamino)-3.6-dichloro-1.4-benzoquinone used as starting material may be prepared by condensing chloranil with para-amino-diphenylamine in the presence of alcohol. It forms a blackish-brown powder melting at a temperature of about 300° C., being insoluble in alcohol and glacial acetic acid, sparingly soluble in ortho-dichlorobenzene.

Instead of para-aminodiphenylamine there may also be used para-amino-N-methyldiphenylamine, meta-aminodiphenylamine, aminophenyl-alpha-naphthylamine, aminophenyl-beta-naphthylamine, aminonaphthylphenylamine, aminodinaphthylamine or the like.

(2) 50 parts of 2.5-di(-2'-amino-diphenylamine)-3.6-dichloro-1.4-benzoquinone—obtainable by condensation of chloroanil with 2-aminodiphenylamine in alcohol—are boiled for 5 hours in 600 parts of nitrobenzene. After cooling, steam is introduced into the reaction mass in order to remove the nitrobenzene, the remaining solid residue is filtered off and dried. The product forms a bluish-black powder. It is insoluble in water and dissolves in concentrated sulfuric acid to an olive-green solution. It dissolves in hot trichlorobenzene to a violet solution, having a brown fluorescence. By sulfonating the product in concentrated sulfuric acid, a sulfonic acid is obtained which dyes silk, wool, cotton, viscose artificial fiber and paper fast bluish-gray tints.

(3) 100 parts of 2.5-di(-para-amino-orthomethoxydiphenylamine)-3.6-dichloro-1.4-benzoquinone—obtainable by condensation of para-amino-ortho-methoxydiphenylamine with chloroanil—are boiled for 3 hours in 1500 parts of nitrobenzene. In order to remove the nitrobenzene, steam is then introduced, the remaining residue is filtered off and dried. It forms a darkviolet powder which dissolves in concentrated sulfuric acid to a green solution. It is sparingly soluble in organic solvents. It dissolves a little in trichlorobenzene to a blue solution, having a red fluorescence.

When sulfonated in strong sulfuric acid, the reaction product yields a dyestuff-sulfonic acid which dyes silk, wool, cotton and viscose artificial fiber etc. blue tints of fastness to light.

(4) 100 parts of 2.5-di(-para-amino-[para'-phenyl]-diphenylamine)-3.6-dichloro-1.4-benzoquinone—obtainable by condensation of para-amino-(para'-phenyl)-diphenylamine with chloranil in alcohol—are boiled for 5 hours in 1000 parts of nitrobenzene. After cooling of the reaction mass, the solvent is removed by introduction of steam, the distillation residue isolated by filtration and dried.

The reaction product forms a dark-violet powder which is sparingly soluble in organic solvents and shows a red fluorescence in trichlorobenzene. It dissolves in concentrated sulfuric acid to an olive-green solution. By sulfonation in concentrated sulfuric acid or fuming sulfuric acid, a sulfonic acid is obtained which dyes wool, silk, cotton, viscose artificial fiber etc. blue tints of good fastness to light.

Similar dyestuffs are obtained by using parent materials which have been prepared by means of 1.4-benzoquinone instead of chloranil, and treating them as described in the foregoing examples.

We claim:

1. The process which comprises boiling in the presence of nitrobenzene and a small amount of phosphorus pentachloride and pyrolusite 2.5-di-(-para-amino-diphenylamino)-3.6-dichloro-1.4-benzoquinone.

2. The process which comprises boiling in the presence of nitrobenzene and a small amount of phosphorus pentachloride and pyrolusite 2.5-di(-para-amino-diphenylamino)-3.6-dichloro-1.4-benzoquinone and then sulfonating the product thus obtained.

3. A compound selected from the group consisting of the compounds of the general formula:

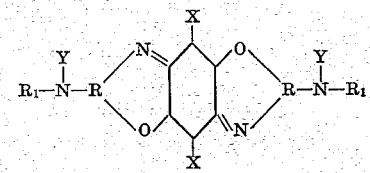

wherein X stands for a radical of the group consisting of hydrogen and halogen, Y for a radical of the group consisting of hydrogen and alkyl, R for an aromatic group of the benzene or naphthalene series, $R_1$ for an aromatic group of the benzene, diphenyl or naphthalene series and wherein the two $R_1$—N—R—chains are identical and the sulfonic acid of these compounds.

4. The compounds of the general formula:

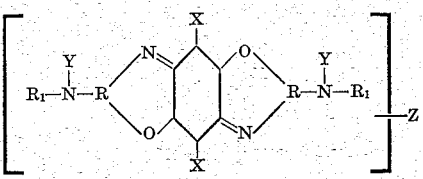

wherein Z means that the compounds contain sulfo groups, X stands for a radical of the group consisting of hydrogen and halogen, Y for a radical of the group consisting of hydrogen and alkyl, R and $R_1$ for an aromatic group of the benzene or naphthalene series, and wherein the two $R_1$—N—R—chains are identical, dyeing wool and silk clear tints of good fastness to light.

5. A compound selected from the group consisting of the compounds of the general formula:

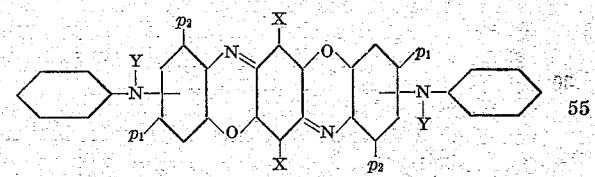

wherein X stands for a radical of the group consisting of hydrogen and halogen, Y for a radical of the group consisting of hydrogen and alkyl and wherein the

groups stand in $p_1$ or $p_2$ position and the sulfonic acids of these compounds.

6. The compounds of the general formula:

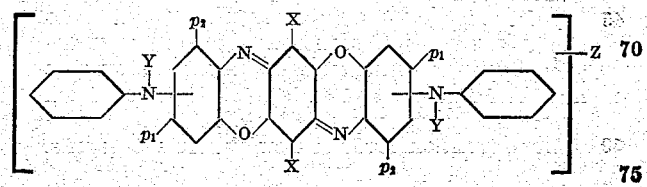

wherein Z means that the compounds contain sulfo groups, X stands for a radical of the group consisting of hydrogen and halogen, Y for a radical of the group consisting of hydrogen and alkyl and wherein the

groups stand in $p_1$ or $p_2$ position, dyeing wool and silk clear tints of good fastness to light.

7. The compound of the formula:

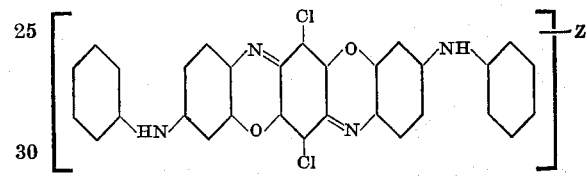

wherein Z means that the dyestuff contains sulfo groups, dyeing silk and wool blue tints of good fastness to light.

8. The compound of the formula:

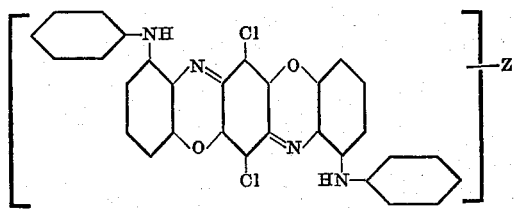

wherein Z means that the dyestuff contains sulfo groups, dyeing silk, wool, cotton, viscose artificial fiber and paper fast blue-gray tints.

9. The compound of the formula:

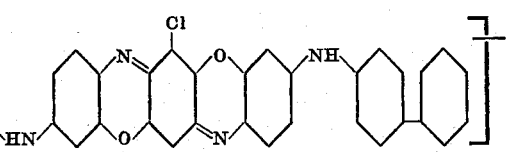

wherein Z means that the dyestuff contains sulfo groups, dyeing wool, silk, cotton, viscose artificial fiber, etc. blue tints of good fastness to light.

GEORG KRÄNZLEIN.
HEINRICH GREUNE.
MAX THIELE.